US010070175B2

(12) United States Patent
Jang

(10) Patent No.: US 10,070,175 B2
(45) Date of Patent: Sep. 4, 2018

(54) METHOD AND SYSTEM FOR SYNCHRONIZING USAGE INFORMATION BETWEEN DEVICE AND SERVER

(71) Applicant: SAMSUNG ELECTRONICS CO., LTD., Suwon-si (KR)

(72) Inventor: Sung-kyu Jang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/157,521

(22) Filed: May 18, 2016

(65) Prior Publication Data

US 2016/0261906 A1 Sep. 8, 2016

Related U.S. Application Data

(63) Continuation of application No. PCT/KR2015/000227, filed on Jan. 9, 2015.

(30) Foreign Application Priority Data

Jan. 9, 2014 (KR) ........................ 10-2014-0003087

(51) Int. Cl.
*H04N 21/437* (2011.01)
*H04N 21/63* (2011.01)
(Continued)

(52) U.S. Cl.
CPC ....... *H04N 21/437* (2013.01); *H04N 1/00244* (2013.01); *H04N 21/2743* (2013.01); *H04N 21/63* (2013.01); *H04N 21/6377* (2013.01)

(58) Field of Classification Search
CPC .......... G06F 17/30265; H04N 1/00244; H04N 1/00315; H04N 1/00912; H04N 2201/3252; H04N 2201/3253; H04N 5/23216
See application file for complete search history.

(56) References Cited

U.S. PATENT DOCUMENTS 7,565,035 B2 7/2009 Wada
7,653,302 B2 1/2010 Limberis et al.
(Continued)

FOREIGN PATENT DOCUMENTS

CN 1641609 A 7/2005
CN 1711750 A 12/2005
(Continued)

OTHER PUBLICATIONS

Search Report and Written Opinion dated Apr. 3, 2015, issued by the International Searching Authority in counterpart International Application No. PCT/KR2015/000227 (PCT/ISA/210 and 237).
(Continued)

*Primary Examiner* — Trung Diep
(74) *Attorney, Agent, or Firm* — Sughrue Mion, PLLC

(57) ABSTRACT

A method and a system for synchronizing information between a device and a server during image processing between the device and the server. A method of synchronizing information between a device and a server, the method including receiving a user input when the device is in a designated operation mode; performing an image processing operation with respect to a first resolution image based on the received user input; collecting image processing parameters corresponding to the image processing operation; and transmitting the image processing parameters to the server.

17 Claims, 10 Drawing Sheets

(51) Int. Cl.
*H04N 1/00* (2006.01)
*H04N 21/2743* (2011.01)
*H04N 21/6377* (2011.01)

(56) References Cited

U.S. PATENT DOCUMENTS

| | | | |
|---|---|---|---|
| 7,844,140 B2 | 11/2010 | Fujita | |
| 8,624,989 B2 | 1/2014 | Carpio et al. | |
| 8,730,336 B2 | 5/2014 | Georgis et al. | |
| 9,215,405 B2* | 12/2015 | Atkinson | H04N 21/4223 |
| 2004/0093432 A1 | 5/2004 | Luo et al. | |
| 2005/0104909 A1* | 5/2005 | Okamura | G06F 3/1454 |
| | | | 345/698 |
| 2006/0268130 A1* | 11/2006 | Williams | H04N 5/23238 |
| | | | 348/239 |
| 2007/0104479 A1 | 5/2007 | Machida | |
| 2007/0201767 A1* | 8/2007 | Fujita | G06F 17/30265 |
| | | | 382/305 |
| 2010/0208083 A1 | 8/2010 | Lee et al. | |
| 2012/0092728 A1 | 4/2012 | Aoki et al. | |
| 2013/0201349 A1 | 8/2013 | Balle-Pedersen et al. | |
| 2013/0286229 A1 | 10/2013 | Georgis et al. | |
| 2014/0002695 A1* | 1/2014 | Kim | G06T 11/60 |
| | | | 348/239 |

FOREIGN PATENT DOCUMENTS

| | | |
|---|---|---|
| CN | 101025764 A | 8/2007 |
| CN | 101217431 A | 7/2008 |
| CN | 101582963 A | 11/2009 |
| CN | 101621603 A | 1/2010 |

OTHER PUBLICATIONS

Communication dated May 3, 2018, issued by the State Intellectual Property Office of the People's Republic of China in counterpart Chinese Patent Application No. 201580003021.1.

* cited by examiner

METHOD AND SYSTEM FOR SYNCHRONIZING USAGE INFORMATION BETWEEN DEVICE AND SERVER

RELATED APPLICATION

This application is a continuation application of PCT International Application No. PCT/KR2015/000227 filed on Jan. 9, 2015, which claims the benefit of Korean Patent Application No. 10-2014-0003087, filed on Jan. 9, 2014 in the Korean Intellectual Property Office, the disclosures of which are incorporated herein in their entirety by reference.

BACKGROUND

1. Field

One or more embodiments of the present invention relate to a method and a system for synchronizing information between a device and a server during image processing between the device and the server.

2. Description of the Related Art

Due to the developments of digital photographing devices, images can now be captured in various modes and various functions may be used therefor. Particularly, due to the developments in communication technology, an image picked up by a device having an photographing function may be uploaded to and stored in a cloud server or a social network service (SNS) server.

However, it is difficult to reflect in a image stored in a server various activities performed at a device due to various reasons including the efficiency of a server, network environment, etc.

SUMMARY

One or more embodiments of the present invention include a method and a system for synchronizing information such that a cloud server may possess information on various activities performed with respect to an image captured by a device or an image played back by a device.

Therefore, since a cloud server possesses information regarding various activities performed at a device, a user may access a cloud server or a SNS server and retrieve the same content as the content used at the terminal without any effort.

Furthermore, interest and correlation may be analyzed based on information regarding activities performed at a device, and an additional image process may be performed based on a result of the analysis. Therefore, a differentiated service may be provided.

Additional aspects will be set forth in part in the description which follows and, in part, will be apparent from the description, or may be learned by practice of the presented embodiments.

According to one or more embodiments of the present invention, a method of synchronizing information between a device and a server, the method includes receiving a user input when the device is in a designated operation mode; performing an image processing operation with respect to a first resolution image based on the received user input; collecting image processing parameters corresponding to the image processing operation; and transmitting the image processing parameters to the server.

The method further includes receiving, by the server, the image processing parameters; and performing, by the server, same image processing operation as the image processing operation performed by the device based on the received image processing parameters with respect to a second resolution image having a higher resolution than the first resolution image.

The first resolution image is a screen nail resolution image, and the second resolution image is a full resolution image.

The method further includes picking up, by the device, an image of an object and generating, by the device, the first resolution image and the second resolution image; and transmitting, by the device, the second resolution image together with the image processing parameters to the server.

The method further includes generating, by the server, the first resolution image from the second resolution image; and transmitting, by the server, the first resolution image to the device.

The performing, by the server, of the image processing operation includes is done with respect to the second resolution image based on the image processing parameters and server parameters pre-set to the server.

The designated operation mode is the still photographing mode, and the image processing parameters includes at least one from among an photographing location, an photographing mode, an photographing setting, and an photographing resolution.

The designated operation mode is the image playback mode, and the image processing parameters includes a parameter corresponding to at least one from among image rotation, image crop, tags, an image correction, and an image playback history.

The designated operation mode is the moving picture pickup mode, and the image processing parameters includes at least one from among an photographing location, an photographing setting, an photographing resolution, and a frame rate.

The collecting of the parameters further includes collecting at least one from between an interest parameter indicating interest of a user with respect to the first resolution image and a correlation information parameter indicating correlation between the first resolution image and functions used at the device, and the transmitting of the image processing parameters to the server further includes transmitting at least one from between the interest parameter and the correlation information parameter.

According to one or more embodiments of the present invention, a device includes a user input unit, which receives a user input in a designated operation mode of the device; a control unit, which performs a control operation to perform an image processing operation with respect to a first resolution image based on the received user input; a parameter collecting unit, which collects image processing parameters corresponding to the image processing operation; and a communication unit, which transmits the image processing parameters to the server.

The device further includes an photographing unit for picking up an image of an object, wherein the control unit performs a control operation to generate the first resolution image and a second resolution image having a higher resolution than the first resolution image and to transmit the second resolution image to the server together with the image processing parameters via the communication unit.

The designated operation mode is the still photographing mode, and the image processing parameters includes at least one from among an photographing location, an photographing mode, an photographing setting, and an photographing resolution.

The designated operation mode is the image playback mode, and the image processing parameters includes a parameter corresponding to at least one from among image rotation, image crop, tags, an image correction, and an image playback history.

The designated operation mode is the moving picture pickup mode, and the image processing parameters includes at least one from among an photographing location, an photographing setting, an photographing resolution, and a frame rate.

The parameter collecting unit collects at least one from between an interest parameter indicating interest of a user with respect to the first resolution image and a correlation information parameter indicating correlation between the first resolution image and functions used at the device, and the communication unit transmits at least one from between the interest parameter and the correlation information parameter.

According to one or more embodiments of the present invention, a server includes a communication unit, which receives image processing parameters corresponding to an image processing operation performed by a device with respect to a first resolution image; and a control unit, which performs a control operation to perform same image processing operation as the image processing operation performed by the device based on the image processing parameters with respect to a second resolution image having a higher resolution than the first resolution image.

The server further includes a database for storing the second resolution image, wherein the control unit performs a control operation to generate the first resolution image from the second resolution image and to transmit the first resolution image to the device via the communication unit.

The communication unit receives the image processing parameters and at least one from between the interest parameters and the correlation information parameters, and the control unit performs a control operation to analyze at least one from among the image processing parameter, the interest parameter, and the correlation information parameters, performs an image processing operation corresponding to a result of the analysis with respect to a second resolution image, and provides a result of the image processing operation to the device.

According to one or more embodiments of the present invention, there are provided computer readable recording media having recorded thereon computer programs for implementing other methods and systems for implementing the present invention and the above method.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
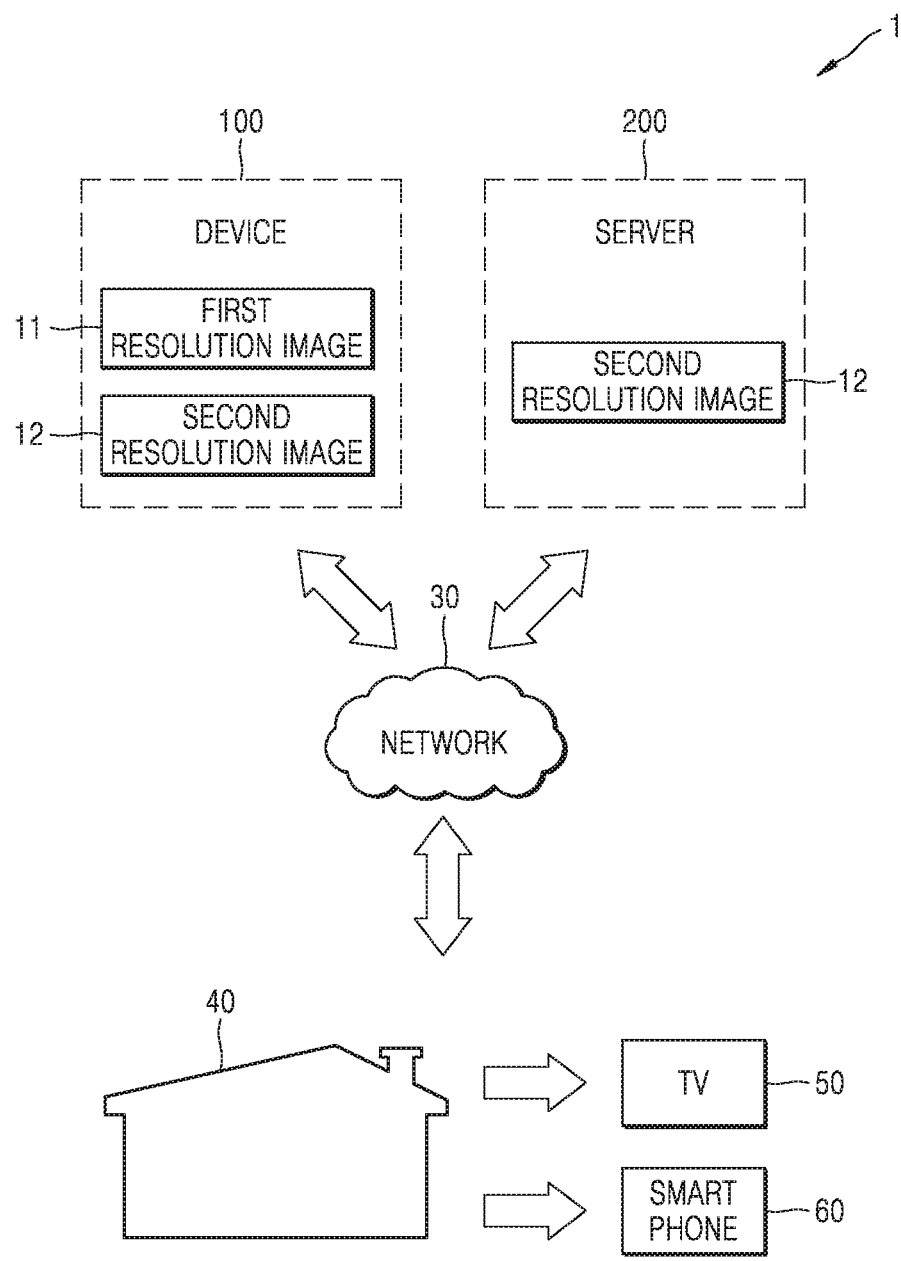
FIG. 1 is a diagram for describing a method of synchronizing information between a device and a server according to an embodiment of the present invention.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. The terms "-er", "-or", and "module" described in the specification mean units for processing at least one function and operation and can be implemented by hardware components or software components and combinations thereof.

The term "an embodiment" or "embodiment" of the inventive concept of the present invention refers to particular characteristics, structures, and features described along with embodiments included in at least one embodiment of the inventive concept of the present invention. Therefore, the term "an embodiment" or "embodiment" used through the specification does not necessarily refer to a same embodiment.

In addition, although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meaning of each term lying within.

In an embodiment, terms "communication," "communication network," and "network" may be used as a same meaning. The three terms above refer to close-distance and wide-area data transmitting/receiving networks for transmitting designated data between an image processing device and a cloud server via a wire or wirelessly.

In an embodiment, the term "cloud server" refers to a server computer that a client accesses for a cloud computing service (referred to hereinafter as 'cloud service'). Here, the cloud service refers to a computing environment in which designated information is permanently stored in a server on the internet and is temporarily stored in a client, which may be an IT device including a digital photographing apparatus, a tablet PC, a computer, a laptop computer, a net-book computer, a smart phone, etc. In other words, the cloud computing is the concept that all information of a user may be stored in a server on the internet and the information may be accessed from anywhere via various IT devices. In other words, the cloud computing refers to a computing service that a user borrows computing resources, such as hardware and software existing in an intangible form like the cloud and pays fees for using the same. In other words, the cloud computing refers to a technique for integrating and providing computing resources at different physical locations by using a virtualization technology.

In an embodiment, an image processing device may be embodied in any of various forms. For example, image processing devices herein may include a digital camera, a mobile phone, a smart phone, a laptop computer, a tablet PC, an e-book device, a digital broadcasting device, a personal digital assistant (PDA), an portable multimedia player (PMP), and a navigation device, but is not limited thereto.

In an image having n megapixel (nM) resolution according to an embodiment, n is a value corresponding to size of an image and may indicate a total number of pixels of the image. For example, 2M resolution refers to a resolution 1920×1080, 4M resolution refers to a resolution 2560×1440, and 8M resolution refers to the ultra high definition (UHD: 3840×2160) resolution. Meanwhile, the values 2M, 4M, and 8M are values approximating the overall pixel numbers of images of the respective resolutions. Therefore, one of ordinary skill in the art will understand that, the 2M resolution, the 8M resolution, or nM resolution are not terms limited to the above-stated combinations of horizontal and vertical sizes and may correspond to the overall pixel number of a resolution including an arbitrary combination of horizontal and vertical sizes.

FIG. 1 is a diagram for describing a method of synchronizing information between a device and a server according to an embodiment of the present invention.

Referring to FIG. 1, a device-server information synchronizing system 1 according to an embodiment of the present invention includes an image processing device 100 (referred to hereinafter as a 'device 100') and a server 200. The device 100 and the server 200 are connected to each other via a network 30 for performing wired/wireless communication. Furthermore, various smart devices, such as a TV 50 and a smart phone 60, may be connected to the server 200 via a home sync system 40 and may transmit/receive data.

The device 100 according to an embodiment of the present invention may pick up an image, perform an image signal process with respect to the picked up image, and generate image data of a designated resolution. The image signal process may refer to an image signal process for improving image quality and providing special effects to picked up raw image data and a series of operations for generating image data compressed according to a designated compression standard. Meanwhile, according to the present invention, an image may include both a still image and a moving picture.

In detail, when a user targets an object in a live-view operation and presses a half-shutter button (some devices may not support a half-shutter operation) or applies a touch input, the device 100 may perform operations for adjusting 3A (AE/AWB/AF: Auto Exposure, Auto White Balance, Auto Focus) in response thereto. Next, the device 100 may pick up an image in response to a shutter input and receive full resolution RAW data.

Next, after an image signal process is performed with respect to the input full resolution RAW data, the processed data is compressed to obtain an image having a designated resolution, thereby generating the first resolution image 11.

The generated first resolution image 11 may be quick-viewed on a display unit of the device 100. Since it is necessary to image-process an image fast for quick-viewing, an image having a smaller resolution than an image having a full resolution (a screen nail image) may be used as a quick-view image.

Meanwhile, while a quick-view image is displayed, the device 100 may perform a designated image process with respect to the full resolution RAW data and generate a second resolution image 12 having a higher resolution than the quick-view image. Furthermore, the second resolution image 12 may not be displayed and may be generated and stored as a JPEG image, a MPEG image, or a compressed image. Furthermore, the device 100 may play back or edit the generated second resolution image 12 later. The first resolution image 11 may be a screen nail image (e.g., a 2M resolution image), whereas the second resolution image 12 may be an image having a higher resolution than the first resolution image 11 or full resolution RAW data (the maximum resolution that may be picked up by the device 100, e.g., 8M resolution).

However, it may take a long time for the device 100 to play back or edit the second resolution image 12. In other words, since the hardware efficiency of the device 100 may be limited due to the cost and size thereof, a user may observe a slow processing speed as the resolution of an image increases. According to the hardware efficiency of the device 100, the device 100 may even be unable to perform image compression corresponding to a designated resolution (e.g., 8M resolution) or higher resolution.

Similarly, in a play back model, the device 100 may generally read out a compressed or uncompressed image stored in a storage unit, perform an image processing operation, such as decoding, and display the image. In this case, a processing time may increase as the resolution of an image to be decoded is higher.

Therefore, the device 100 according to an embodiment of the present invention may perform distributed processing by processing only the first resolution image 11 (e.g., 2M resolution) and transmitting the second resolution image 12 to the server 200 so that the server 200 image-processes the second resolution image 12. In other words, the device 100 according to an embodiment of the present invention may perform an image processing operation by using the first resolution image, and thus, an image may be edited and displayed without any image slowdown.

For example, the server 200 may perform image processing operations, such as compression of full resolution RAW data to obtain the second resolution image 12 or application of special effects.

For convenience of explanation, FIG. 1 shows that the device 100 has both the first resolution image 11 and the second resolution image 12, the second resolution image 12 is transmitted to the server 200, and the server 200 has only the second resolution image 12. However, the present invention is not limited thereto. For example, the server 200 may have both the first resolution image 11 and the second resolution image 12, and when a designated image is requested in an image play back mode of the device 100, the server 200 may transmit only the first resolution image 11 corresponding to the requested image to the device 100 for playback.

Therefore, according to an embodiment of the present invention described below, the device 100 displays the first resolution image 11 and performs an image processing operation with respect to the first resolution image 11.

Therefore, for fast image process in the below embodiment of the present invention, the device 100 displays the first resolution image 11 and performs an image processing operation with respect to the first resolution image 11. Next, the server 200, which has a second resolution image corresponding to the original image of the first resolution image, performs the same image processing operation with respect to the second resolution image via information synchronization.

Meanwhile, in the distributed processing system, various setups and edits based on user inputs may be performed with respect to the first resolution image 11 of the device 100 and may be reflected in real time. However, it may be inconvenient to repeatedly perform the same setups and edits with respect to the second resolution image 12 at the server 200.

Therefore, in order to process a first resolution image, the device-server information synchronization system 1 according to an embodiment of the present invention may transmit information corresponding to the setups and the image processing operations performed at the device 100 to the server 200 so that the server 200 may perform same or similar operations.

Furthermore, the device 100 transmits information regarding a user's preference in an photographing mode or image playback mode or information regarding operations of applications used for pre-process/post-process to the server 200 so that the corresponding operations are performed with respect to the second resolution image stored in the server 200. In other words, the device 100 may transmit not only a record regarding image processing operations of the device 100 itself, but also records of operations performed by various applications used at the device 100 to the server 200. Thus, the user preference and user convenience may be reflected in the second resolution image stored in the server 200.

Particularly, the server 200 may be a cloud server or a social network service (SNS) server, and the second resolution image 12 to which image processing operations performed at the device 100 and user preference/convenience are reflected may be displayed at various devices (e.g., a TV 50 or a smart phone 60) connected to the server 200 via the network 30.

Hereinafter, a method of synchronizing information between the device 100 and the server 200 will be described with reference to FIGS. 2 through 9.

Figure 2:
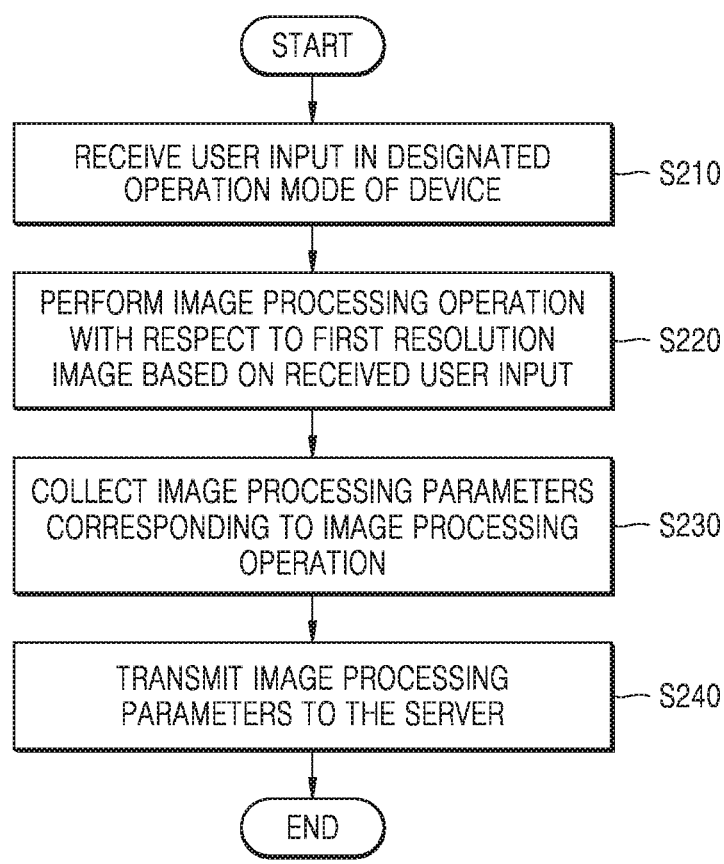
FIG. 2 is a flowchart for describing operations of a device for information synchronization between the device and a server, according to an embodiment of the present invention.

FIG. 2 is a flowchart for describing operations of the device 100 for information synchronization between the device 100 and the server 200, according to an embodiment of the present invention.

Referring to FIG. 2, in an operation s210, the device 100 may receive a user input in a designated operation mode. The designated operation mode may be one from among a still photographing mode, a moving picture pickup mode, and an image playback mode.

For example, the device 100 may receive an photographing start signal and an photographing setting signal in a still photographing mode or a moving picture pickup mode. In another example, the device 100 may receive an operation signal for performing rotating, cropping, or correcting an image displayed in an image playback mode.

In an operation s220, the device 100 according to an embodiment of the present invention may perform an image processing operation with respect to a first resolution image based on the received user input. The first resolution image may be a screen nail image for displaying a quick-view image.

Next, in an operation s230, the device 100 according to an embodiment of the present invention may collect image processing parameters corresponding to an image processing operation.

For example, if the device 100 is in the still photographing mode, the image processing parameters may include an photographing location, an photographing mode, an photographing setting, and an photographing resolution.

Meanwhile, an photographing setting may include a portrait photographing setting, a landscape photographing setting, a macro photographing setting, a successive photographing setting, or a self-portrait photographing setting. Furthermore, an photographing setting may include settings regarding whether to use face recognition, image stabilization, or lens distortion correction, and settings regarding ISO, white balance, etc.

In another example, if the device 100 is in the moving picture pickup mode, the image processing parameters may include an photographing location, an photographing setting, an photographing resolution, and a frame rate. The photographing setting may include settings regarding whether to use face recognition, image stabilization, or lens distortion correction, and settings regarding ISO, white balance, etc.

In another example, if the device 100 is in the image playback mode, the image processing parameters may include information regarding image rotation, image crop, tags, an image correction, and an image playback history.

The image playback history may be data in which image processing operations of a user with respect to the first resolution image are recorded in chronological order. Therefore, by repeating the image processing operations, which are performed with respect to the first resolution image, with respect to the second resolution image in the same order, the server 200 may generate the second resolution image on which the same image processing operations as performed by the device 100 are performed.

Meanwhile, the image processing parameters are not limited thereto, and the image processing parameters may further include mode parameters for the server 200 to perform image processing operations, which are performed with respect to a first resolution image at the device 100, with respect to a second resolution image. Therefore, the image processing parameters may include an interest parameter and correlation information parameters as described below with reference to FIGS. 7 through 9.

Furthermore, collected image processing parameters may be either integrated with image data or stored as separate data. For example, if a first resolution image is a result of image processing operations of the device 100, the image processing parameters may be recorded in the header of the first resolution image. For another example, since a second resolution image may be transmitted from the device 100 to the server 200, the image processing parameters regarding the first resolution image may be stored to the header or the tail of the second resolution image. In another example, image processing parameters may be stored as separate data from the first resolution image and the second resolution image.

In an operation s240, the device 100 according to an embodiment of the present invention may transmit image processing parameters to the server 200. In this case, image data on which image processing operations corresponding to the image processing parameters are performed may be transmitted to the server 200 together with the image processing parameters.

Therefore, the server 200 may perform designated image processing operations with respect to the second resolution image based on the received image processing parameters.

Figure 3:
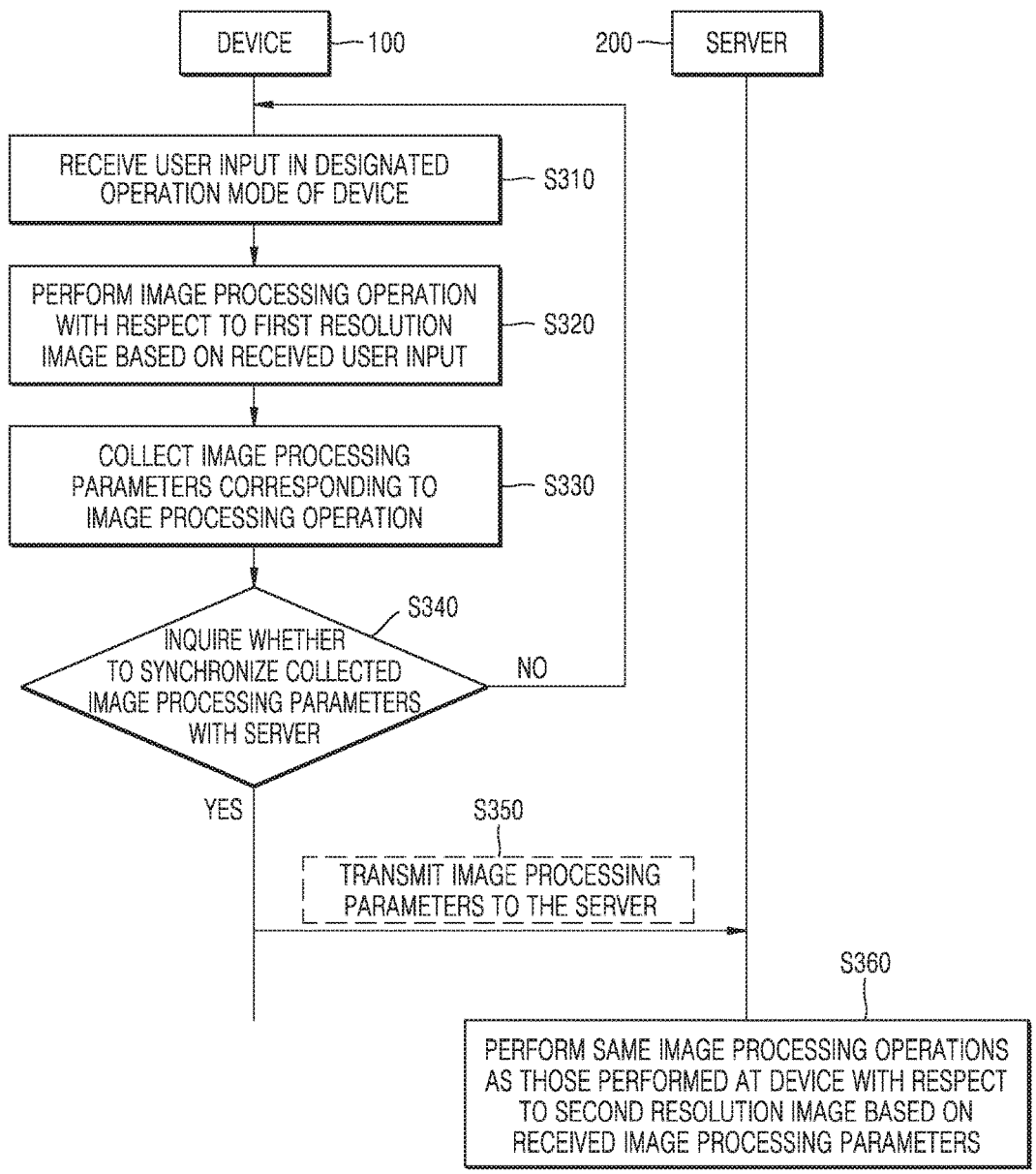
FIG. 3 is a flowchart of a method of synchronizing information between a device and a server according to an embodiment of the present invention.

FIG. 3 is a flowchart of a method of synchronizing information between a device and a server according to an embodiment of the present invention.

Referring to FIG. 3, operation s310 through s330 correspond to the operations s210 through s230 of FIG. 2 that have been already described.

In an operation s340, the device 100 may inquire a user ??? whether to synchronize collected image processing parameters with the server 200. Therefore, the device 100 may cumulatively record image processing parameters corresponding to image processing operations until a parameter synchronization inquiry signal is input. The parameter synchronization inquiry signal may be input based on a user input or may be input periodically at a designated interval.

In an operation s350, when a parameter synchronization inquiry signal is input, the device 100 may transmit image processing parameters to the server 200.

In an operation s350, the server 200 may perform same image processing operations as those performed by the device 100 with respect to a second resolution image based on the received image processing parameters. Alternatively, the server 200 may perform image processing operations with respect to the second resolution image based on the image processing operations and server parameters preset to the server. The server parameter may be a parameter for performing an image processing operation for adding a designated tag or a parameter for performing an image processing operation for categorizing images based on photographing settings.

Figure 4:
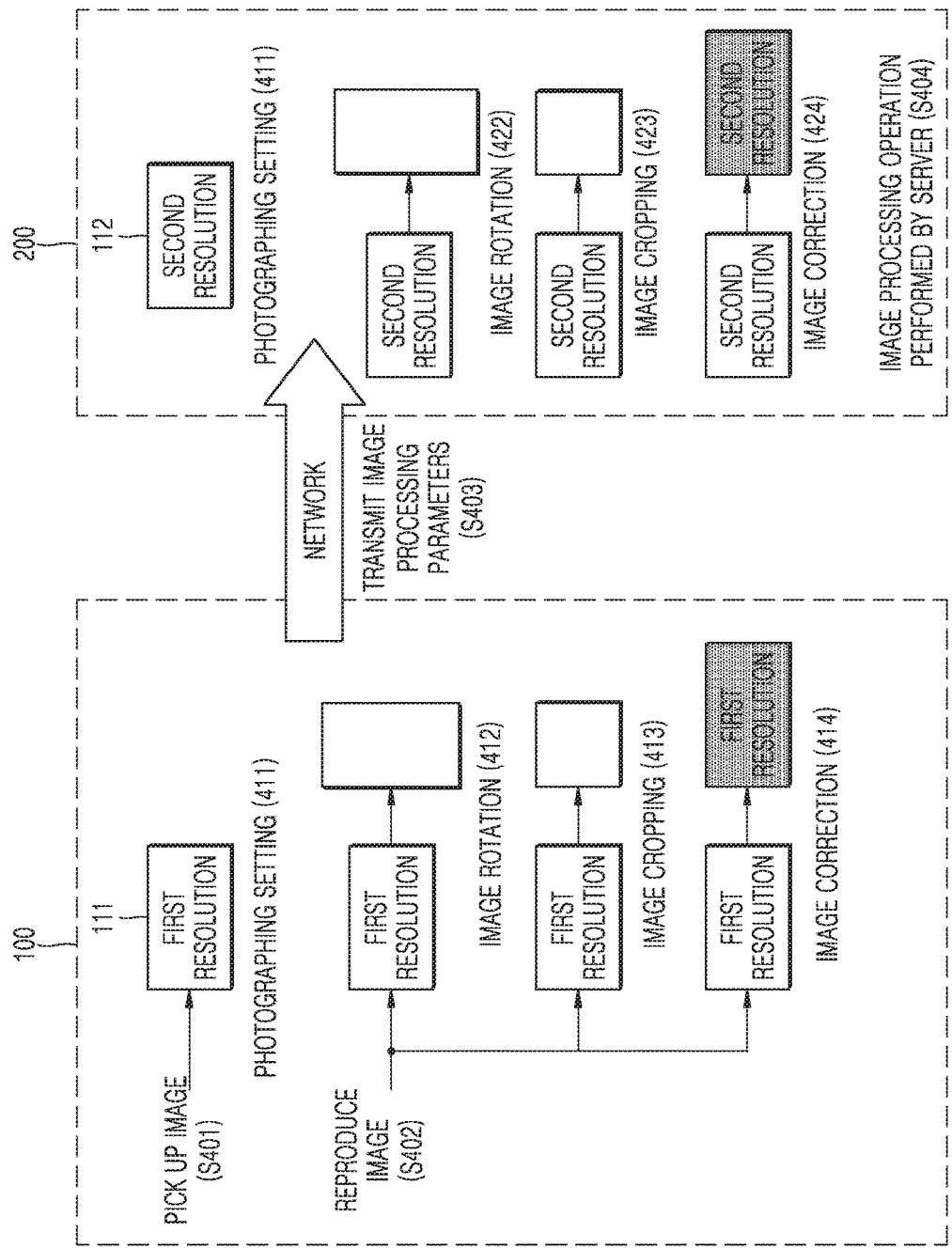
FIG. 4 is a diagram for describing an example of synchronizing still image processing operation of the device according to an embodiment of the present invention.

Hereinafter, FIG. 4 is a diagram for describing an example of synchronizing still image processing operation of the device 100 according to an embodiment of the present invention.

Referring to FIG. 4, image processing operations performed by the device 100 with respect to a first resolution image 111 may be identically performed by the server 200 with respect to a second resolution image 112.

For example, in an operation s401, the device 100 may pick up an image and generates a full resolution RAW data. Next, the device 100 may compress the full resolution RAW data to obtain the first resolution image 111 and display the first resolution image 111. In this case, the full resolution RAW data may be transmitted to the server 200 and may be compressed to a second resolution image having a higher resolution than the first resolution image 111. However, the present invention is not limited thereto, and the server 200 may store second resolution images having higher resolution than a first resolution image in various ways. Furthermore, if the server 200 according to an embodiment of the present invention provides cloud computing functions, the second resolution image may be stored in the server 200 in the form of the full resolution RAW data and may be used for image processes.

Furthermore, the device 100 may record an photographing setting 411 in the photographing mode and may transmit the recorded photographing setting 411 as image processing parameters to the server 200 in an operation s403. For example, an image processing parameter indicating whether a lens distortion correction is set may be transmitted to the server 200. If lens distortion correction is not performed while the full resolution RAW data is compressed to obtain the first resolution image 111, an image processing parameter indicating that lens distortion correction is not performed is collected.

In an operation s404, the server 200 may perform operations corresponding to image processing parameters with respect to the second resolution image 112. For example, if photographing setting of image processing parameters indicates that lens distortion correction is not performed, the server 200 may not perform lens distortion correction when the full resolution RAW data is compressed to the second resolution image 112.

Next, in the operation s402, the device 100 may perform designated image processing operations based on a user input in the image playback mode. For example, an image rotating operation 412, a cropping operation 413, a tag inputting operation, and an image correcting operation 414 may be performed with respect to the first resolution image 111. Next, the device 100 may collect image processing parameters corresponding to performed image processing operations and transmit the collected image processing parameters to the server 200 in the operation s403.

In an operation s404, the server 200 may perform image processing operations identical to those performed at the device 100. For example, an image rotating operation 422, a cropping operation 423, a tag inputting operation, and an image correcting operation 424 may be performed with respect to the second resolution image 112. The image correcting operation may refer to operations for changing colors or lines of an image.

As described above, the server 200 may also store information regarding various activities performed with respect to an image picked up or reproduced at the device 100 and may perform the same activities.

Figure 5:
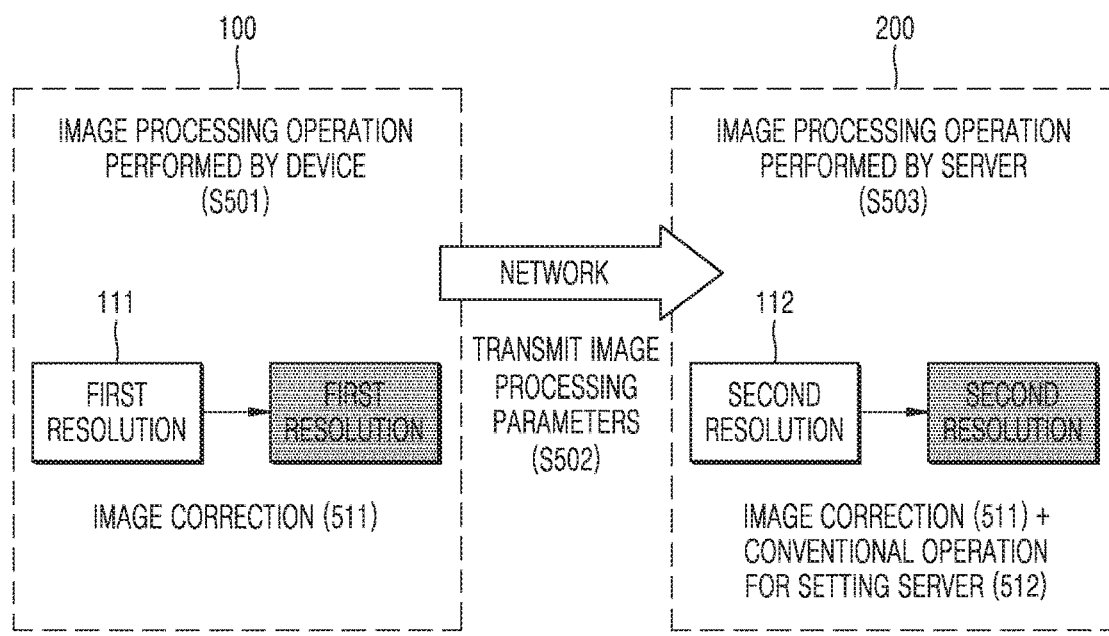
FIG. 5 is a diagram for describing another example of synchronizing still image processing operation of the device according to an embodiment of the present invention.

FIG. 5 is a diagram for describing another example of synchronizing still image processing operation of the device 100 according to an embodiment of the present invention.

Referring to FIG. 5, in an operation s501, the device 100 may perform designated image processing operations in the image playback mode. D descriptions of the designated image processing operation have been already given above with respect to the operation s402 of FIG. 4.

In an operation s502, the device 100 may collect image processing parameters corresponding to image processing operations and transmit the collected image processing parameters to the server 200.

In an operation s503, the server 200 may perform image processing operations with respect to the second resolution image 112 based on the received image processing parameters and server parameters preset to the server 200. For example, an image correction operation 511 and an operation preset to the server 200, e.g., HDR, with respect to the second resolution image 112. In another example, second resolution images may be categorized based on photographing locations or photographing settings based on photographing locations or photographing settings indicated by image processing parameters.

Figure 6:
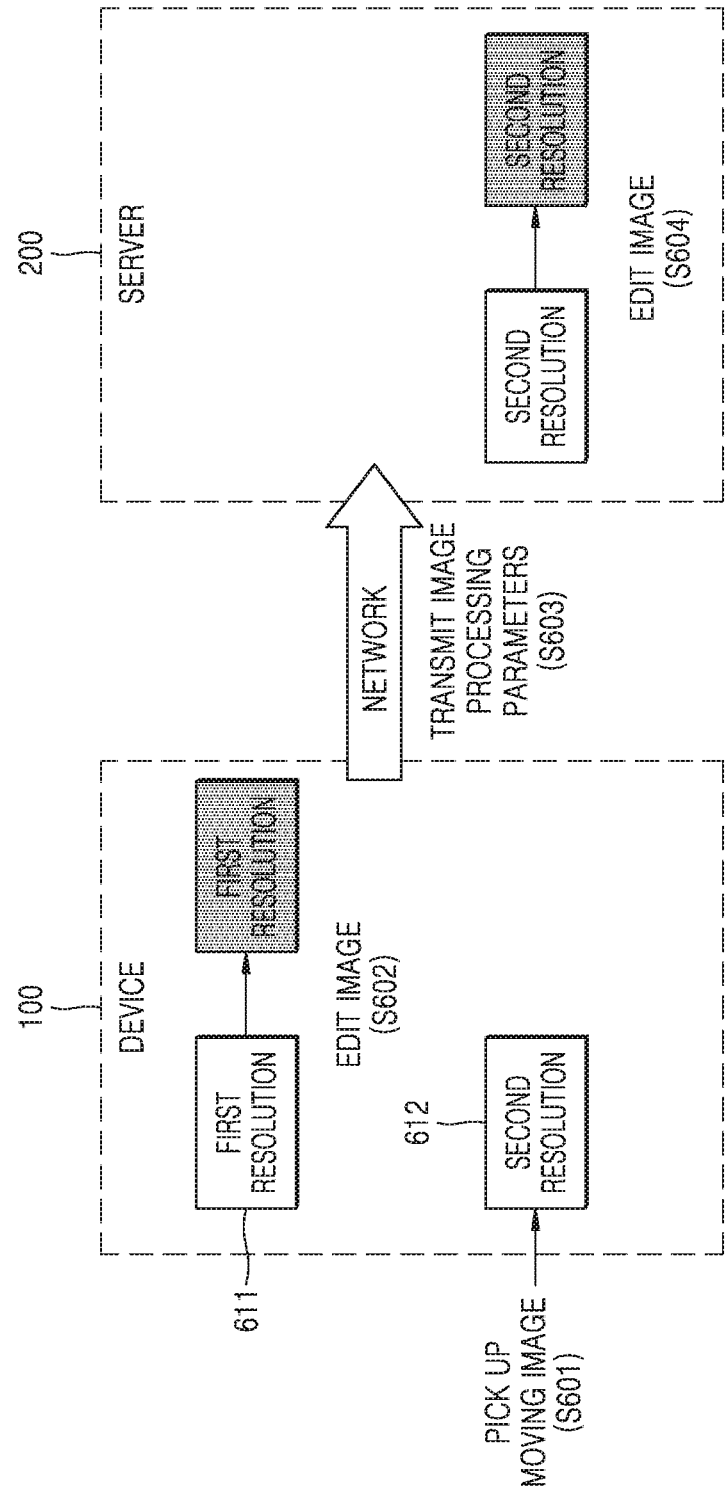
FIG. 6 is a diagram for describing an example of synchronizing a moving picture processing operation of the device according to an embodiment of the present invention.

FIG. 6 is a diagram for describing an example of synchronizing a moving picture processing operation of the device 100 according to an embodiment of the present invention.

Meanwhile, since a moving picture may be understood as a combination of a plurality of still images, the descriptions of the synchronization method regarding still images given above may apply as-is to the synchronization method regarding moving pictures.

However, referring to FIG. 6, in an operation s601, the device 100 may generate a first resolution moving picture 611 corresponding to the first resolution image 111 of FIG. 4 and a second resolution moving picture 612 corresponding to the second resolution image 112 of FIG. 4. For example, the second resolution moving picture 612 may be a full high definition (HD) moving picture to be played back at the rate of 60 frames per second at a resolution equal to or higher than 1920×1080. On the contrary, the first resolution moving picture 611 may be a lower quality moving picture generated by extracting intra frames (I frames) from the second resolution moving picture 612 or via additional size reduction.

In an operation s602, the device 100 may perform image processing operations with respect to the first resolution moving picture 611 in the image playback mode. For example, the device 100 may apply image stabilization or transcoding (e.g., converting an avi file to a mp4 file) to the first resolution moving picture 611. In another example, the device 100 may cut and paste a moving picture or extract a designated moving picture file. In other words, the device 100 may perform image processing operations with respect to the first resolution moving picture 611 rather than the second resolution moving picture 612, thereby further reducing image processing time.

In an operation s603, the device 100 may transmit image processing parameters to the server 200. Furthermore, the second resolution moving picture 612 may be transmitted together with the image processing parameters to the server 200. In this case, the image processing parameters may be integrated with the second resolution moving picture 612 or may be transmitted separately from the second resolution moving picture 612.

In an operation s604, the server 200 may perform image processing operations identical to the image processing operations performed at the device 100. For example, the server 200 may apply image stabilization or transcoding on the second resolution moving picture 612 in correspondence to image processing operations performed with respect to the first resolution moving picture 611. In another example, the server 200 may cut and paste a moving picture or extract a designated moving picture file.

However, the present invention is not limited thereto. For example, the device 100 may perform image processing operations with respect to the second resolution moving picture 612 without using the first resolution moving picture 611.

Figure 7:
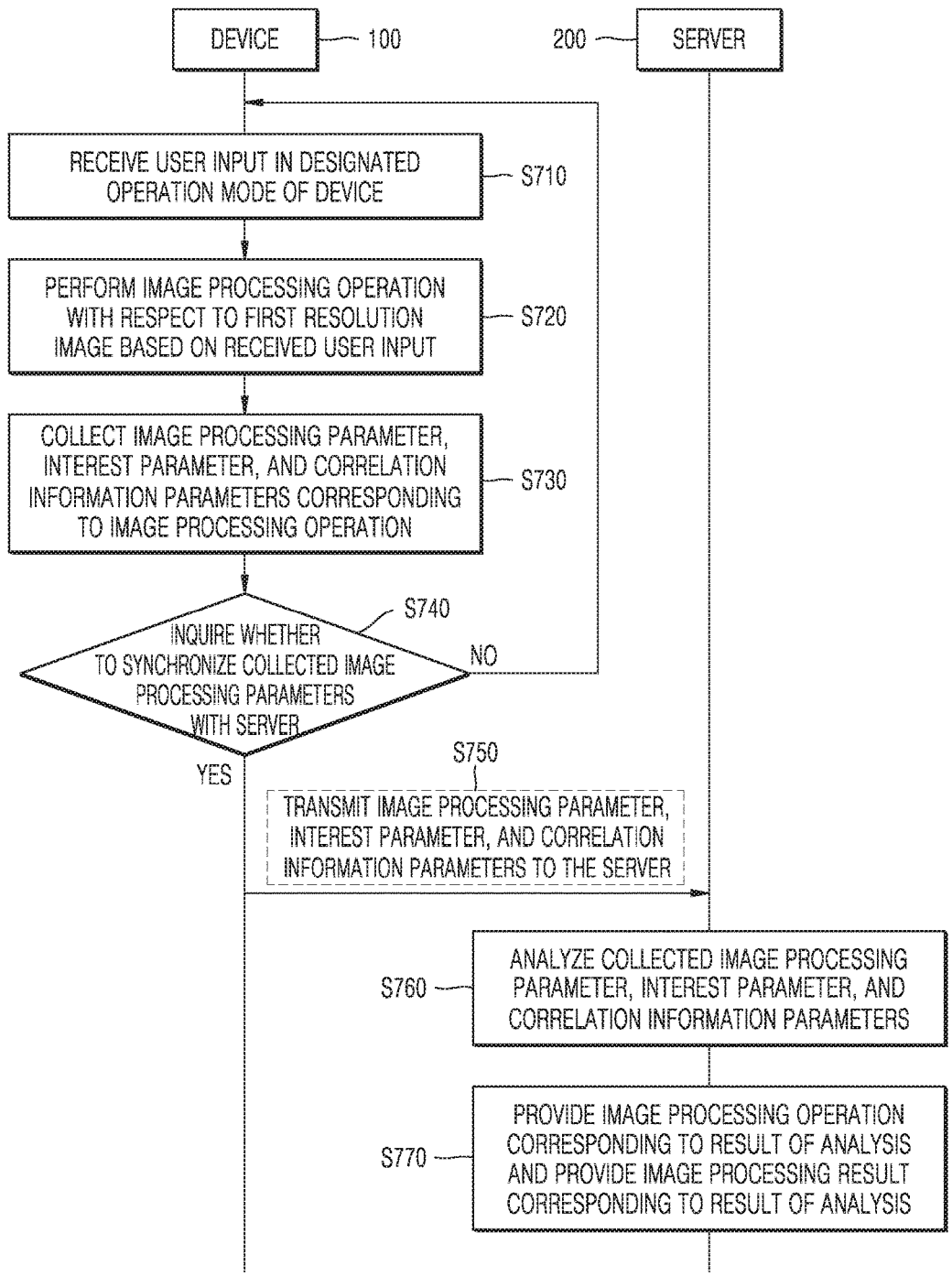
FIG. 7 is a flowchart of a method of synchronizing information between the device and the server according to another embodiment of the present invention.

FIG. 7 is a flowchart of a method of synchronizing information between the device 100 and the server 200 according to another embodiment of the present invention.

In an operation s710, the device 100 according to an embodiment of the present invention may receive a user input in a designated operation mode. The designated operation mode may be one from among a still photographing mode, a moving picture pickup mode, and an image playback mode.

In an operation s720, the device 100 according to an embodiment of the present invention may perform an image processing operation with respect to a first resolution image based on the received user input. In this case, the first resolution image may be a screen nail image for displaying a quick view screen image.

Next, in an operation s730, the device 100 according to an embodiment of the present invention may collect an image processing parameter, an interest parameter, and correlation information parameters corresponding to the image processing operation. The interest parameter indicates interest of a user with respect to the first resolution image, whereas the correlation information parameters may indicate correlation between the first resolution image and functions used at the device 100.

For example, if the device 100 is in the photographing mode, the interest parameter may indicate a history of picking up similar images, user status at the time of picking up the first resolution image (e.g., heart rate or blood pressure), and weather condition at the time of picking up the first resolution image (e.g., atmospheric pressure, temperature, etc.).

In another example, if the device 100 is in the image playback mode, the interest parameter may include information regarding playback time and information regarding image zoom regions.

Therefore, the server 200 described below may determine interest regarding a designated image by analyzing the interest parameter.

In another example, the device 100 may determine a user interest based on collected interest parameter or an interest may be manually set by a user and the device 100 may perform a separate image processing operation with respect to an image based on the interest. First, a user may perform a designated marking with respect to an interesting image or an image considered as being important during image playback of the device 100, and the marked image may be determined as a highly interested image. The marking may include all operations for selecting a highly interested image, such as clicking an image. Furthermore, by performing separate image processing operations, the device 100 may upload only a second resolution image corresponding to an image determined as being highly interesting to the server 200, may not upload less interesting images to the server 200, or may change display priorities and display methods based on user interests. However, the present invention is not limited thereto, and one of ordinary skill in the art will understand that the separate image processing operations may include a series of image processing operations that can be differently performed based on interests.

Furthermore, if the device 100 is in the image playback mode, correlation information parameters may include contact tag designation information, specific information regarding used application, information regarding image sharing, and information regarding music designation.

In an operation s740, the device 100 according to an embodiment of the present invention may receive a confirmation whether to synchronize collected image processing parameters with the server 200. Therefore, the device 100 may continuously and cumulatively record image processing parameters corresponding to image processing operations until a parameter synchronization confirmation signal is input.

In an operation s750, when a parameter synchronization confirmation signal is input, the device 100 may transmit an image processing parameter, an interest parameter, and correlation information parameters to the server 200. In an operation s760, the server 200 may analyze the collected image processing parameter, the interest parameter, and the correlation information parameters and obtain information regarding interests of a user and correlation. For example, the user's interest on a designated image may be determined based on a history of picking up similar images, status of the user during an photographing, image playback time, and image zoom-in region. Alternatively, a user's interest on a designated image may be determined based on information regarding interests manually set in the operation s730 by marking the designated image, as described above.

Furthermore, in an operation s770, the server 200 may provide an image processing operation corresponding to a result of the analysis and provide an image processing result corresponding to the result of the analysis. In other words, the device 100 or any of various smart devices connected via a network (e.g., the TV 50 or the smart phone 60) that accesses the server 200 later may receive the image processing result.

Meanwhile, the image processing operations corresponding to image processing parameters have been described above with reference to FIGS. 3 through 6. Meanwhile, although it is assumed that image processing operations performed by the server 200 are performed with respect to a second resolution image, the present invention is not limited thereto, and the present embodiment may also be applied to a case in which the device 100 and the server 200 store images of same resolution.

First, the server 200 according to an embodiment of the present invention may perform a separate image processing operation with respect to an image based on an analysis of an interest parameter.

For example, the server 200 may determine a feeling of a user based on a status of the user during an photographing and may process an image differently based on the determined feeling.

In another example, the server 200 may process an image differently based on weather during an photographing (e.g., application of different white balances with respect to respective weather conditions).

In another example, the server 200 may determine a still image corresponding to a high image playback time as a highly interesting image based on an interest parameter, so that the highly interesting image may be played back first when the device 100 later plays back images in the server 200.

In another example, the server 200 may determine a magnified image region as a highly interesting region based on an interest parameter, so that the magnified image may be displayed when the device 100 later plays back images in the server 200 or may be separately stored as a region of interest (ROI).

In another example, the server 200 may process a designated image to different resolutions based on interests thereon or may apply different display priorities and display formats based on interests thereon.

In another example, the server 200 may transmit a highly interesting image to another user who is registered in advance and may store a less interesting image as-is without performing a separate image processing operation thereon.

However, the present invention is not limited thereto, and one of ordinary skill in the art will understand that a separate image processing operation may further include a series of image processing operations that may be performed differently based on interests. In another example, the server 200 may transmit a second resolution image stored in a server to a contact address tagged to a first resolution image based on a result of analyzing correlation information or may categorize second resolution images having tagged thereto a same contact address into a same folder.

In another example, the server 200 may categorize images shared only to a particular person based on a result of analyzing correlation information.

In example, based on a result of analyzing correlation information, the server 200 may request a user to purchase a music file assigned to a first resolution image or, if the music file has been already purchased, may assign the music file to a second resolution image as well. Furthermore, the server 200 may inquire of the user or recommend the user to easily access other music files of same musician later.

In another example, the server 200 analyzes a list of applications executed by the device 100 during analysis of correlation information. Next, a full version of an application used by the device 100 may be invoked in relation to a second resolution image. In this case, only the server 200 may obtain a license of an application to be used with respect to an image, whereas a device may only obtain and use a limited license. In other words, the device 100 performs an image processing operation by using an application capable of performing an image processing operation with respect to a first resolution image only, wherein image processing parameters and correlation information parameters may be transmitted to the server 200. Therefore, a second resolution image stored in the server 200 may be image-processed by using a licensed application.

Figure 8:
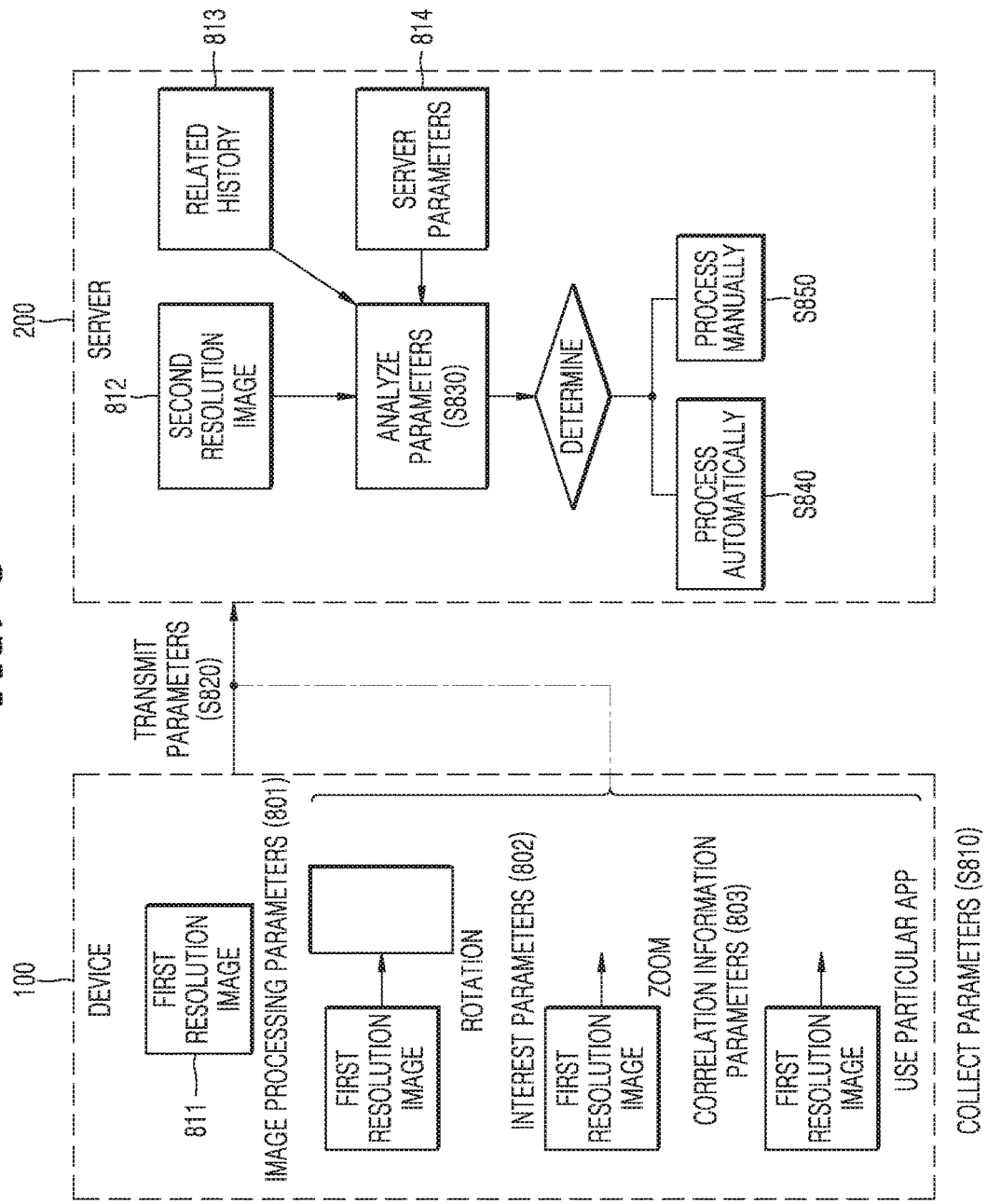
FIG. 8 is a diagram for describing an example where the device synchronizes a still image processing operation, according to another embodiment of the present invention.

FIG. 8 is a diagram for describing an example where the device 100 synchronizes a still image processing operation, according to another embodiment of the present invention.

Referring to FIG. 8, in an operation S810, the device 100 may collect image processing parameters 801, interest parameters 802, and correlation information parameters 803 corresponding to an image processing operation regarding a first resolution image. The detailed descriptions of the image processing parameters have been presented above with reference to FIGS. 3 through 6.

For example, when the device 100 is in an photographing mode, the interest parameters 802 include during an photographing user status (e.g., heart rate or blood pressure) and photographing condition (e.g., atmospheric pressure, temperature, lighting condition, etc.). In this case, a history of picking up similar images may be determined based on whether a successive photographing function is used or based on an analysis of histogram-based correlations regarding a plurality of images.

In another example, when the device 100 is in an photographing mode, the interest parameters 802 may include information regarding image playback time and an image zoom region. For example, when the device 100 provides a slideshow of still images, a user will play back uninterested images only shortly, and information indicating that images with short playback times are less interesting may be recorded in the interest parameters 802.

Furthermore, if a designated region of a first resolution image is magnified based on an user input while images of the device 100 are played back by a user, the device 100 records the magnified region or the magnified image in interest parameters, thereby recording the magnified region or the image where the magnification took place as interesting image.

In another example, a user may apply a designated marking with respect to an interesting image or an image considered as being important while images of the device 100 are played back by the user, and the marked images may be considered as highly interesting images. Furthermore, via a separate image processing operation, the device 100 may upload only second resolution images corresponding to images determined as being highly interesting images to the server 200, may not upload less interesting images to the server 200, or may apply different display priorities and display formats based on user's interests.

In another example, when the device 100 is in an image playback mode, the interest parameters 802 may include information regarding designated phone number tag, specific information regarding used application, information regarding image sharing, and information regarding music designation.

In an operation S820, the device 100 may transmit the collected image processing parameters 801, the interest parameters 802, and the correlation information parameters 803 to the server 200. In this case, the image processing parameter 801, the interest parameter 802, and the correlation information parameters 803 may be included in second resolution image data 812 and transmitted together or may be transmitted to the server 200 as separate data.

In an operation S830, the server 200 may obtain information regarding interests of a user and correlation by analyzing the image processing parameters, the interest parameters, and the correlation information parameters.

Meanwhile, the server 200 may store not only the image processing parameters, the interest parameters, and the correlation information parameters of the device 100, but also related history 831 of another device. Therefore, the server 200 may compare the image processing parameter, the interest parameter, and the correlation information parameters received from the device 100 to the related history 813 and may extract information regarding interests of a user and correlation regarding user operations that may be determined as being meaningful to the user.

Furthermore, the server 200 may have pre-set server parameters 814. In this case, the server parameters 814 may be parameters for performing an image processing operation for adding a designated tag or an image processing operation for categorizing images having same photographing settings.

In an operation S840, an image processing operation regarding a second resolution image may be performed based on the analyzed parameters.

The image processing operations corresponding to image processing parameters have been described above with reference to FIGS. 3 through 6.

The server 200 may determine a feeling of a user by analyzing a status of the user during an photographing from image processing parameters and may process an image differently based on the determined feeling.

Furthermore, the server 200 may analyze a weather condition during an photographing based on image processing parameters and may process an image differently (e.g., application of different white balances with respect to respective weather conditions) based on a result of the analysis. In this case, the related history 813 of another device may be utilized for the analysis of the weather condition to predict a weather condition during photographing of a second resolution image.

In another example, the server 200 may categorize a still image corresponding to a long playback time as a highly interesting image based on interest parameters, so that the highly interesting image may be played back first when the device 100 plays back images in the server 200.

In the same regard, the server 200 may categorize a magnified image region as a highly interesting region based on interest parameters, so that the magnified image may be displayed when the device 100 later plays back images in the server 200 or may be separately stored as a region of interest (ROI).

In another example, the server 200 may categorize similar images into a same folder and manage them based on interest parameters. In this case, similar images may be determined based on whether a successive photographing function is used or based on an analysis of histogram-based correlations regarding a plurality of images.

In another example, the server 200 may process a designated image according to different resolutions or may apply different display priorities and display formats based on interest parameters.

In another example, the server 200 may automatically transmit a highly interesting image to another user who is registered in advance and may store a less interesting image as-is without performing a separate image processing operation thereon.

However, the present invention is not limited thereto, and one of ordinary skill in the art will understand that a separate image processing operation may further include a series of image processing operations that may be performed differently based on interests.

In another example, the server 200 may transmit a second resolution image stored in a server to a contact address tagged to a first resolution image based on a result of analyzing correlation information or may categorize second resolution images having tagged thereto a same contact address into a same folder.

In another example, the server 200 may categorize images shared only to a particular person based on a result of analyzing correlation information.

For example, based on a result of analyzing correlation information, the server 200 may request a user to purchase a music file assigned to a first resolution image or, if the music file has been already purchased, may assign the music file to a second resolution image as well. Furthermore, the server 200 may recommend the user to easily access other music files of same musician later or may inquire of the user if the user wants to access other music files of same musician later.

In another example, the server 200 analyzes a list of applications executed by the device 100 during analysis of correlation information. Next, a full version of an application used by the device 100 may be invoked in relation to a second resolution image. In this case, only the server 200 may obtain a license of an application to be used in relation to an image, whereas a device may only obtain and use a limited license. In other words, the device 100 performs an image processing operation by using an application capable of performing an image processing operation with respect to a first resolution image only, wherein the image processing parameters 801, the interest parameters 802, and the correlation information parameters 803 may be transmitted to the server 200. Therefore, a second resolution image stored in the server 200 may be image-processed by using a licensed application t.

In an operation S850, the server 200 may perform manual operations that needs user inputs with respect to a second resolution image 812 based on a result of analyzing parameters. Therefore, the server 200 may inquire of or recommend a user about purchasing a music file assigned to an image based on a result of analyzing correlation information. Alternatively, the server 200 may request a user to purchase an application used by the device 100 to process a first resolution image in order to process a second resolution image.

Figure 9:
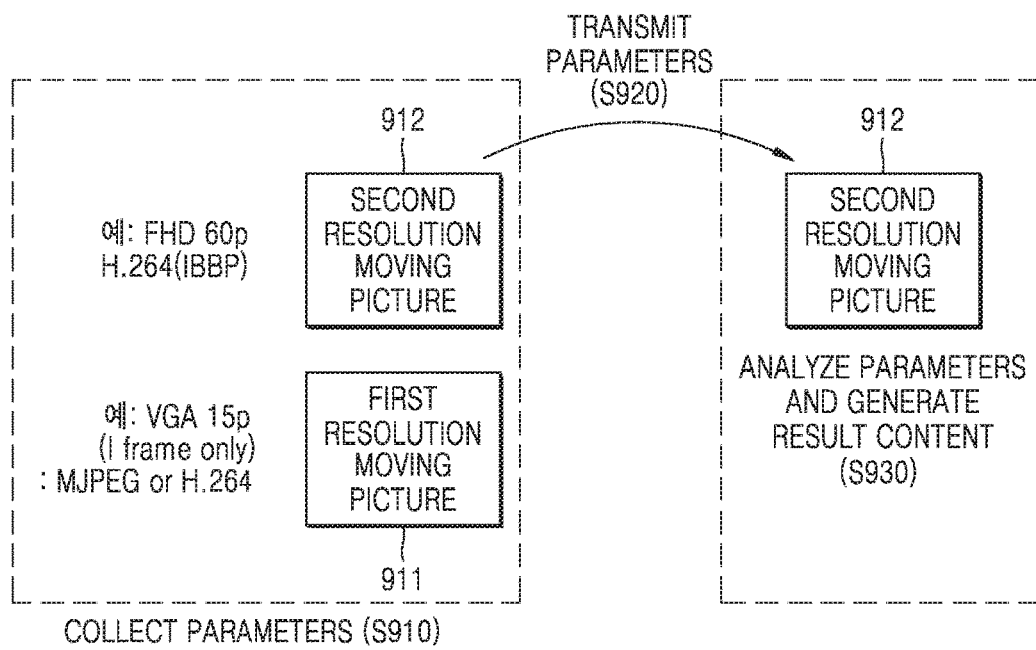
FIG. 9 is a diagram for describing an example where the device synchronizes a moving picture processing operation, according to another embodiment of the present invention.
Figure 10:
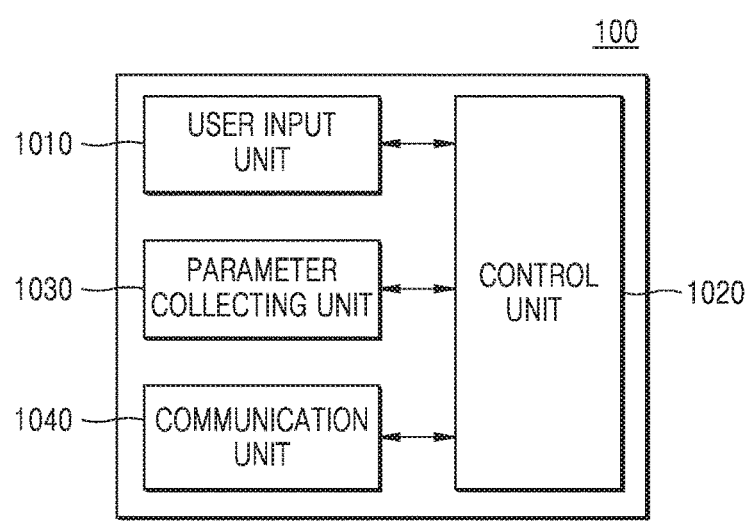
FIGS. 10 and 11 are block diagrams of the device according to an embodiment of the present invention; and, FIG. 12 is a block diagram showing the server according to an embodiment of the present invention.

FIG. 9 is a diagram for describing an example where the device 100 synchronizes a moving picture processing operation, according to another embodiment of the present invention.

Referring to FIG. 9, the device 100 according to an embodiment of the present invention may generate a first resolution moving picture 911 for processing images in the device 100 from a second resolution moving picture 912. In this case, the first resolution moving picture may be a moving picture having VGA resolution and 15 frames/s frame rate. Furthermore, a compression format thereof may comply with the MJPEG standard and the H.264 standard. The second resolution moving picture may be a moving picture having an FHD resolution and a frame rate of 60 frames/s. Furthermore, a compression format thereof complies with the H.264 standard.

In an operation S910, the device 100 may collect image processing parameter, interest parameter, and correlation information parameters regarding an image processing operation with respect to the first resolution moving picture 911.

For example, the image processing parameters may include a history of edit actions, such as removal of a portion of the first resolution moving picture 911.

Furthermore, the interest parameters may include information regarding a final playback position watched by a user and playback time.

Furthermore, the correlation information parameters may include information regarding a music designation or a sharing operation related to the first resolution moving picture.

In an operation S920, the device 100 may transmit the image processing parameter, the interest parameter, and the correlation information parameters to the server 200. In this case, the image processing parameters are either included in the second resolution moving picture and transmitted together or transmitted separately.

In an operation S930, the server 200 analyzes the the image processing parameter, the interest parameter, and the correlation information parameters and may generate a result content by performing image processing operations based on a result of the analysis.

For example, the server 200 may perform a moving picture edit operation with respect to the first resolution moving picture in correspondence to an image processing operation performed with respect to the first resolution moving picture.

For example, the server 200 may generate image clips corresponding to playback positions watched by a user at the device 100 based on the interest parameters. In other words, the server 200 may extract highly interested images.

In another example, the server 200 may insert a designated music file in the second resolution moving picture or may share the second resolution moving picture based on the correlation information parameters.

Figure 11:
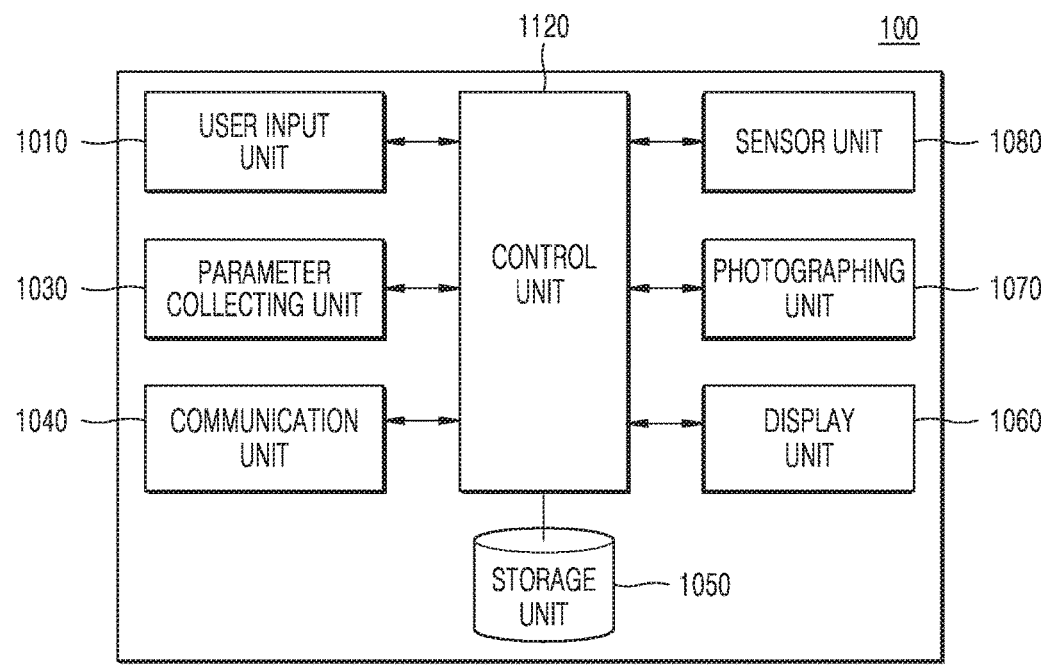
Figure 12:
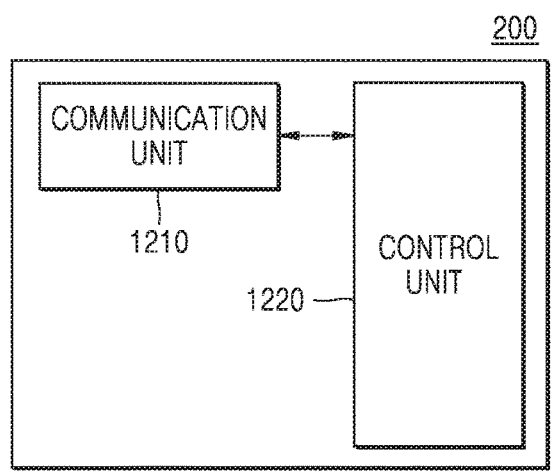

FIGS. 11 through 13 are diagrams showing the device 100 and the server 200 according to an embodiment of the present invention. The device 100 and the server 200 are devices capable of performing the above-described method for synchronizing information between a device and a server according to all embodiments described above with reference to FIGS. 1 through 10.

FIGS. 11 and 12 are block diagrams of the device 100 according to an embodiment of the present invention.

Only components related to the present embodiment are shown in the device 100 of FIGS. 11 and 12. Therefore, one of ordinary skill in the art will understand that general purpose components other than the components shown in FIGS. 11 and 12 may further be included in the device 100.

Referring to FIG. 11, the device 100 according to an embodiment of the present invention may include a user input unit 1010, a control unit 1020, and a parameter collecting unit 1030.

The user input unit 1010 according to an embodiment of the present invention includes any of various input devices enabling a user to input desired information, such as a touch panel or key buttons, and may receive user inputs in a designated operation mode of the device 100. For example, a user may set an operation mode of the device 100 as a general photographing mode, a moving picture pickup mode, and an image playback mode via the user input unit 1010. Furthermore, the user input unit 1010 may receive a signal for performing magnification of an image being displayed in the image playback mode.

The control unit 1020 according to an embodiment of the present invention may perform a control operation to perform an image processing operation with respect to a first resolution image based on a received user input. In this case, the control unit 1020 may be embodied as a single processor or a plurality of processors and may control overall operations of the device 100. In other words, the control unit 1020 may control the user input unit 1010, the parameter collecting unit 1030, and a communication unit 1040.

The parameter collecting unit 1030 according to an embodiment of the present invention may collect image processing parameters corresponding to an image processing operation.

In another example, the parameter collecting unit 1030 may further collect interest parameters indicating interest of a user on a first resolution image and correlation information parameters indicating correlation between the first resolution image and functions used at the device 100.

The communication 1040 according to an embodiment of the present invention may transmit the image processing parameters to the server 200. In another example, the communication unit 1040 may further transmit the interest parameters and the correlation information parameters to the server 200.

In this case, the communication unit 1040 may include a network interface card or a model for enabling data transmissions and receptions between the device 100 and the server 200.

Referring to FIG. 12, the device 100 according to an embodiment of the present invention may further include a storage unit 1050, a display unit 1060, an photographing unit 1070, and a sensor unit 1080.

The storage unit 1050 according to an embodiment of the present invention may store images. Furthermore, the storage unit 1050 may also store full resolution RAW data or an HD resolution image. In this case, the storage unit 1050 may be embodied as a non-volatile storage medium for storing digital data, such as a hard disk drive (HDD) or a flash memory.

The display unit 1060 according to an embodiment of the present invention may include means for visually displaying screen images, such as a LCD module or a LED module. A first resolution image and a user interface for editing an image may be displayed on the display unit 1060. Furthermore, if the display unit 1060 is embodied as a touch panel, the display unit 1060 may also perform functions of the user input unit 1010.

The photographing unit 1070 according to an embodiment of the present invention may pick up an image of an object and generate full resolution RAW data. The photographing unit 1070 may include a lens, an aperture, a shutter, and an image sensor for picking up an image of an object, wherein a resolution of a picked up image may be determined based on the image sensor.

The sensor unit 1080 according to an embodiment of the present invention may include various sensors for detecting user status (e.g., heart rate or blood pressure) and weather conditions (e.g., atmospheric pressure, temperature, etc.) during an photographing.

FIG. 13 is a block diagram showing the server 200 according to an embodiment of the present invention.

Only components related to the present embodiment are shown in the server 200 of FIG. 13. Therefore, one of ordinary skill in the art will understand that general purpose components other than the components shown in FIG. 13 may further be included in the server 200.

Referring to FIG. 13, the server 200 according to an embodiment of the present invention may further include a communication unit 1210 and a control unit 1220.

The communication unit 1210 according to an embodiment of the present invention may receive image processing parameters corresponding to an image processing operation performed by the device 100 with respect to a first resolution image. For another example, the communication unit 1210 may further receive interest parameters and correlation information parameters together with the image processing parameters.

The control unit 1220 according to an embodiment of the present invention may perform a control operation to perform same image processing operation as an image processing operation performed by the device 100 with respect to a second resolution image based on the received image processing parameters.

For another example, the control unit 1220 may analyze the image processing parameter, the interest parameter, and the correlation information parameters, perform an image processing operation corresponding to a result of the analysis with respect to a second resolution image, and provide a result of the image processing operation.

Meanwhile, the server 200 may further include a database (not shown) in which a first resolution image and a second resolution image may be stored.

As described above, according to the one or more of the above embodiments of the present invention, a method and a system for synchronizing information, such that a cloud server may possess various activities performed with respect to an image captured by a device or an image played back by a device may be provided.

Furthermore, since a cloud server possesses information regarding various activities performed at a device, a user may access a cloud server or a SNS server and retrieve the same content as the content used at the terminal without an effort.

Furthermore, interest and correlation may be analyzed based on information regarding activities performed at a device, and an additional image process may be performed based on a result of the analysis. Therefore, a differentiated service may be provided.

The device described herein may comprise a processor, a memory for storing program data and executing it, a permanent storage unit such as a disk drive, a communications port for handling communications with external devices, and user interface devices, including a touch panel, keys, buttons, etc. When software modules or algorithms are involved, these software modules may be stored as program instructions or computer readable codes executable on a processor on a computer-readable medium. Examples of the computer readable recording medium include magnetic storage media (e.g., ROM, floppy disks, hard disks, etc.), and optical recording media (e.g., CD-ROMs, or DVDs). The computer readable recording medium can also be distributed over network coupled computer systems so that the computer readable code is stored and executed in a distributed fashion. This media can be read by the computer, stored in the memory, and executed by the processor.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims.

What is claimed is:

1. A method of synchronizing information between a device and a server, the method comprising:
   receiving a user input when the device is in a designated operation mode;
   performing an image processing operation with respect to a first resolution image based on the received user input;
   collecting image processing parameters, an interest parameter indicating an interest of a user with respect to the first resolution image, and a correlation information parameter indicating a correlation between the first resolution image and functions used at the device, wherein the image processing parameters, the interest parameter and the correlation information parameter correspond to the image processing operation; and
   transmitting the image processing parameters, the interest parameter and the correlation information parameter to the server.

2. The method of claim 1, further comprising:
   receiving, by the server, the image processing parameters, the interest parameter and the correlation information parameter;
   analyzing, by the server, the image processing parameters, the interest parameter and the correlation information parameter;
   performing, by the server, an image processing operation corresponding to a result of the analyzing with respect to a second resolution image having a higher resolution than the first resolution image; and
   providing, by the server, a result of the image processing operation corresponding to the result of the analyzing to the device.

3. The method of claim 2, wherein the first resolution image is a screen nail resolution image, and
   the second resolution image is a full resolution image.

4. The method of claim 2, further comprising:
   picking up, by the device, an image of an object and generating, by the device, the first resolution image and the second resolution image; and
   transmitting, by the device, the second resolution image together with the image processing parameters to the server.

5. The method of claim 2, further comprising:
   generating, by the server, the first resolution image from the second resolution image; and
   transmitting, by the server, the first resolution image to the device.

6. The method of claim 2, wherein the performing, by the server, of the image processing operation corresponding to the result of the analyzing comprises performing the image processing operation corresponding to the result of the analyzing with respect to the second resolution image based on the image processing parameters and server parameters pre-set to the server.

7. The method of claim 1, wherein the designated operation mode is a still photographing mode, and
   the image processing parameters comprises at least one from among an photographing location, an photographing mode, an photographing setting, and an photographing resolution.

8. The method of claim 1, wherein the designated operation mode is an image playback mode, and the image processing parameters comprises a parameter corresponding to at least one from among image rotation, image crop, tags, an image correction, and an image playback history.

9. The method of claim 1, wherein the designated operation mode is a moving picture pickup mode, and the image processing parameters comprises at least one from among an photographing location, an photographing setting, an photographing resolution, and a frame rate.

10. A device comprising:

a user interface configured to receive a user input in a designated operation mode of the device;

at least one processor configured to:

perform a control operation to perform an image processing operation with respect to a first resolution image based on the received user input, and collect image processing parameters, an interest parameter indicating an interest of a user with respect to the first resolution image, and a correlation information parameter indicating a correlation between the first resolution image and functions used at the device, wherein the image processing parameters, the interest parameter and the correlation information parameter correspond to the image processing operation; and a communication interface configured to transmit the image processing parameters, the interest parameter and the correlation information parameter to a server.

11. The device of claim 10, further comprising an photographing unit for picking up an image of an object, wherein the at least one processor is further configured to perform a control operation to generate the first resolution image and a second resolution image having a higher resolution than the first resolution image and to transmit the second resolution image to the server together with the image processing parameters, the interest parameter and the correlation information parameter via the communication interface.

12. The device of claim 10, wherein the designated operation mode is a still photographing mode, and the image processing parameters comprises at least one from among an photographing location, an photographing mode, an photographing setting, and an photographing resolution.

13. The device of claim 10, wherein the designated operation mode is an image playback mode, and the image processing parameters comprises a parameter corresponding to at least one from among image rotation, image crop, tags, an image correction, and an image playback history.

14. The device of claim 10, wherein the designated operation mode is a moving picture pickup mode, and the image processing parameters comprises at least one from among an photographing location, an photographing setting, an photographing resolution, and a frame rate.

15. A server comprising:

a communication interface configured to receive image processing parameters, an interest parameter indicating an interest of a user with respect to a first resolution image, and a correlation information parameter indicating a correlation between the first resolution image and functions used at a device, wherein the image processing parameters, the interest parameter and the correlation information parameter correspond to an image processing operation performed by a device with respect to the first resolution image; and at least one processor configured to perform a control operation to analyze the image processing parameter, the interest parameter and the correlation information parameter, to perform an image processing operation corresponding to a result of the analysis with respect to a second resolution image having a higher resolution than the first resolution image, and to provide a result of the image processing operation to the device.

16. The server of claim 15, further comprising a database for storing the second resolution image, wherein the at least one processor is further configured to perform a control operation to generate the first resolution image from the second resolution image and to transmit the first resolution image to the device via the communication interface.

17. A non-transitory computer readable recording medium having recorded thereon a computer program for implementing the method of claim 1.

* * * * *